United States Patent
Xu et al.

(10) Patent No.: US 11,494,577 B2
(45) Date of Patent: Nov. 8, 2022

(54) METHOD, APPARATUS, AND STORAGE MEDIUM FOR IDENTIFYING IDENTIFICATION CODE

(71) Applicant: TENCENT TECHNOLOGY (SHENZHEN) COMPANY LIMITED, Shenzhen (CN)

(72) Inventors: Dianping Xu, Shenzhen (CN); Chen Ran, Shenzhen (CN); Jie Miao, Shenzhen (CN); Xiaoyi Jia, Shenzhen (CN); Mei Jiang, Shenzhen (CN); Yugeng Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 79 days.

(21) Appl. No.: 17/003,507

(22) Filed: Aug. 26, 2020

(65) Prior Publication Data
US 2020/0394376 A1    Dec. 17, 2020

Related U.S. Application Data

(63) Continuation of application No. PCT/CN2019/098862, filed on Aug. 1, 2019.

(30) Foreign Application Priority Data

Aug. 16, 2018  (CN) .......................... 201810934332.5

(51) Int. Cl.
*G06K 7/14*    (2006.01)
*G06T 7/13*    (2017.01)
(Continued)

(52) U.S. Cl.
CPC ......... *G06K 7/1469* (2013.01); *G06K 7/1443* (2013.01); *G06K 7/1447* (2013.01);
(Continued)

(58) Field of Classification Search
CPC .. G06K 7/1469; G06K 7/1443; G06K 7/1447; G06T 7/13; G06T 3/4007; G06T 3/4069; G06N 3/08
See application file for complete search history.

(56) References Cited

U.S. PATENT DOCUMENTS 8,905,314 B2 * 12/2014 van der Merwe ... G06K 7/1443
235/462.15
2011/0155808 A1 * 6/2011 Santos .................. G06K 7/146
235/462.15
(Continued)

FOREIGN PATENT DOCUMENTS

| CN | 103530590 A | 1/2014 |
|---|---|---|
| CN | 104573601 A | 4/2015 |

(Continued)

OTHER PUBLICATIONS

International Search Report with English translation and Written Opinion regarding PCT/CN2019/098862 dated Oct. 8, 2019, 9 pages.
(Continued)

*Primary Examiner* — Laura A Gudorf
(74) *Attorney, Agent, or Firm* — Crowell & Moring LLP

(57) ABSTRACT

The present disclosure describes method, apparatus, and storage medium for identifying an identification code. The method includes obtaining, by a computer device, a to-be-detected picture. The computer device includes a memory storing instructions and a processor in communication with the memory. The method also includes detecting, by the computer device, an identification code in the to-be-detected picture to obtain a detection result, the detection result comprising target information of a target code corresponding to the identification code; sampling, by the computer device, the target code according to the target information, to obtain a sampled image; and decoding, by the computer
(Continued)

device, the sampled image, to obtain an identification result corresponding to the identification code.

18 Claims, 9 Drawing Sheets

(51) Int. Cl.
    *G06N 3/08*     (2006.01)
    *G06T 3/40*     (2006.01)

(52) U.S. Cl.
    CPC .............. *G06N 3/08* (2013.01); *G06T 3/4007* (2013.01); *G06T 3/4069* (2013.01); *G06T 7/13* (2017.01)

(56) References Cited

U.S. PATENT DOCUMENTS

| | | | |
|---|---|---|---|
| 2011/0221923 | A1 | 9/2011 | Nakai et al. |
| 2012/0273563 | A1 | 11/2012 | Shimamoto et al. |
| 2014/0042297 | A1* | 2/2014 | Madej ................ G06K 7/10722 250/208.1 |
| 2019/0188729 | A1* | 6/2019 | Mao ..................... G06V 30/194 |
| 2021/0200971 | A1* | 7/2021 | Che ..................... G06K 7/1443 |

FOREIGN PATENT DOCUMENTS

| | | | |
|---|---|---|---|
| CN | 104751093 | A | 7/2015 |
| CN | 104751097 | A | 7/2015 |
| CN | 105046186 | A | 11/2015 |
| CN | 106548110 | A | 3/2017 |
| CN | 106610835 | A | 5/2017 |
| CN | 107067006 | A | 8/2017 |
| CN | 107155110 | A | 9/2017 |
| CN | 107194318 | A | 9/2017 |
| CN | 107491709 | A | 12/2017 |
| CN | 107609525 | A | 1/2018 |
| CN | 107944325 | A | 4/2018 |
| CN | 108268641 | A | 7/2018 |
| CN | 108366253 | A | 8/2018 |
| CN | 109325491 | A | 2/2019 |
| EP | 2921998 | A1 | 9/2015 |
| JP | 2003-337941 | | 11/2003 |
| JP | 2008-027157 | | 2/2008 |
| JP | 2009-272982 | | 11/2009 |
| JP | 2011-193157 | | 9/2011 |
| JP | 2016-017757 | | 2/2016 |
| JP | 2016-028364 | | 2/2016 |
| KR | 2018023363 | A | 3/2018 |

OTHER PUBLICATIONS

Japanese Office Action with English concise translation regarding JP2020-551561 dated Nov. 29, 2021.
Extended European Search Report regarding EP 19 84 9577.2 dated Apr. 26, 2021, 15 pages.
Shiyang Liu, "Anti-counterfeit system based on mobile phone QR code and fingerprint," Intelligent Human Machine Systems and Cybernetics (IHMSC), 2010 2nd International Conference On, IEEE, Piscataway, NJ, Aug. 26, 2010, pp. 236-240.
Kato et al., "Low resolution QR-code recognition by applying super-resolution using the property of QR-codes," 2001 International Conference on Document Analysis and Recognition, Sep. 1, 2011, pp. 992-996.
Lin et al., "2D Barcode Image Decoding," Mathematical Problems in Engineering, vol. 2013, Jan. 1, 2013, pp. 1-10.
Shreyas Fadnavis, "Image Interpolation Techniques in Digital Image Processing: An Overview," retrieved from the Internet: URL: https://core.ac.uk/download/pdf/26523628.pdf Section 2.2; p. 70, Oct. 1, 2014, pp. 2248-962270, XP055794962.
Tong et al., "QR Code Detection Based on Local Features," Internet Media Computing and Service, ACM, Jul. 10, 2014, pp. 319-322.
Chinese Office action with concise English translation regarding 201810934332.5 dated Sep. 13, 2022.
Sun et al., "Automatic Identification Technology-Application of two-dimensional code," 2011 IEEE International Conference on Automation and Logistics (ICAL), Jan. 23, 2011, pp. 164-168.

* cited by examiner

Original image | Compressed and sent | Forwarded and compressed repeatedly

Target code | Bilinear interpolation result | Image super-resolution reconstruction result Manner provided in the related art Manner in an embodiment of this application

METHOD, APPARATUS, AND STORAGE MEDIUM FOR IDENTIFYING IDENTIFICATION CODE

RELATED APPLICATIONS

This application is a continuation application of PCT Patent Application No. PCT/CN2019/098862, filed on Aug. 1, 2019, which claims priority to Chinese Patent Application No. 201810934332.5, filed with the China National Intellectual Property Administration on Aug. 16, 2018, both of which are incorporated herein by reference in their entireties.

FIELD OF THE TECHNOLOGY

This application relates to the field of identification code technologies, and in particular, to an identification code identification method and apparatus, a computer device, and a storage medium.

BACKGROUND OF THE DISCLOSURE

With the development of computer information technologies, an identification code technology has emerged, and the emergence of the identification code technology makes people's lifestyles become more convenient and efficient. For example, the convenient and efficient lifestyles such as riding through an identification code, payment through an identification code, and running an applet through an identification code cannot be implemented without the support of the identification code technology.

The identification code identification manner in the related art is performing operations such as sampling and decoding on an entire to-be-detected picture. This identification manner usually has the following problems: As shown in FIG. 1, the entire to-be-detected picture may be quite large, but the identification code occupies only a quite small part of the entire picture; or as shown in FIG. 2, the entire to-be-detected picture may have much interference information. For the foregoing two cases, the entire identification process may consume a lot of time in identification of a non-identification code region. Therefore, the identification efficiency is low.

SUMMARY

Embodiments of this application provide an identification code identification method and apparatus, a computer device, and a storage medium, which can achieve high identification efficiency and resolve the foregoing technical problem.

A method for identifying an identification code in a to-be-detected picture is provided, running in a computer device comprising a memory storing instructions and a processor in communication with the memory. The method includes obtaining, by the computer device, a to-be-detected picture; detecting, by the computer device, an identification code in the to-be-detected picture to obtain a detection result, the detection result including target information of a target code corresponding to the identification code; sampling, by the computer device, the target code according to the target information, to obtain a sampled image; and decoding, by the computer device, the sampled image, to obtain an identification result corresponding to the identification code.

An apparatus for identifying an identification code in a to-be-detected picture is provided. The apparatus includes a memory storing instructions; and a processor in communication with the memory. When the processor executes the instructions, the processor is configured to cause the apparatus to perform operations comprising: obtain a to-be-detected picture; detect an identification code in the to-be-detected picture to obtain a detection result, the detection result comprising target information of a target code corresponding to the identification code; sample the target code according to the target information, to obtain a sampled image; and decode the sampled image, to obtain an identification result corresponding to the identification code.

A computer device is provided, including a memory and a processor, the memory storing a computer program, the computer program when executed by the processor, causing the processor to perform the following operations: obtaining a to-be-detected picture; detecting an identification code in the to-be-detected picture to obtain a detection result, the detection result including target information of a target code corresponding to the identification code; sampling the target code according to the target information, to obtain a sampled image; and decoding the sampled image, to obtain an identification result corresponding to the identification code.

A non-transitory computer readable storage medium storing computer readable instructions is provided. The computer readable instructions, when executed by a processor, are configured to cause the processor to perform operations comprising: obtaining a to-be-detected picture; detecting an identification code in the to-be-detected picture to obtain a detection result, the detection result including target information of a target code corresponding to the identification code; sampling the target code according to the target information, to obtain a sampled image; and decoding the sampled image, to obtain an identification result corresponding to the identification code.

In the foregoing identification code identification method and apparatus, computer device, and storage medium, after a to-be-detected picture is obtained, an identification code in the to-be-detected picture is first detected, to obtain a detection result, the detection result including target information of a target code corresponding to the identification code; then the target code is sampled according to the target information, to obtain a sampled image; and finally, the sampled image is decoded to obtain an identification result corresponding to the identification code. After the to-be-detected picture is obtained, operations such as sampling and decoding are not performed directly on the entire to-be-detected picture. Instead, the entire picture is detected first, to obtain the detection result for the identification code, the detection result including the target information of the target code corresponding to the identification code. Then, the operations such as sampling and decoding are performed on the target code. In this way, interference on a non-identification code region in the to-be-detected picture can be reduced, thereby improving the identification efficiency of the identification code.

DESCRIPTION OF EMBODIMENTS

Figure 1:
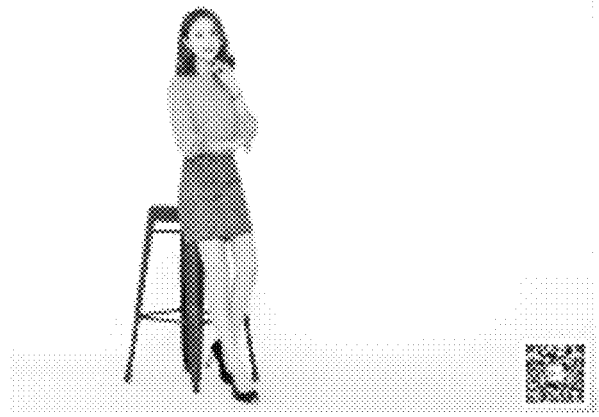
FIG. 1 is an exemplary picture with a large image and a small code.
Figure 2:
FIG. 2 is an exemplary picture with much interference.

To make objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

The terms such as "first" and "second" in the specification, claims, and accompanying drawings of this application are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

An identification code identification method provided in this application may be applied to an identification code identification engine. The identification engine may be started by scanning an identification code or setting a to-be-detected picture. An application environment thereof is shown in FIG. 3.

A scanning device 302 communicates with a computer device 304. A to-be-detected picture may be acquired by using the scanning device 302, and the to-be-detected picture is sent to the computer device 304. After obtaining the to-be-detected picture, the computer device 304 detects an identification code in the to-be-detected picture to obtain a detection result, the detection result including target information of a target code corresponding to the identification code; samples the target code according to the target information, to obtain a sampled image; and decodes the sampled image, to obtain an identification result corresponding to the identification code.

The scanning device 302 may include, but not limited to, a scanner, a camera, or the like. The computer device 304 may be, but not limited to, a personal computer, a notebook computer, a smartphone, a tablet computer, and a portable wearable device. In a possible implementation, the computer device 304 may alternatively be a server. The server may be implemented by an independent server or a server cluster formed by a plurality of servers.

Figure 3:
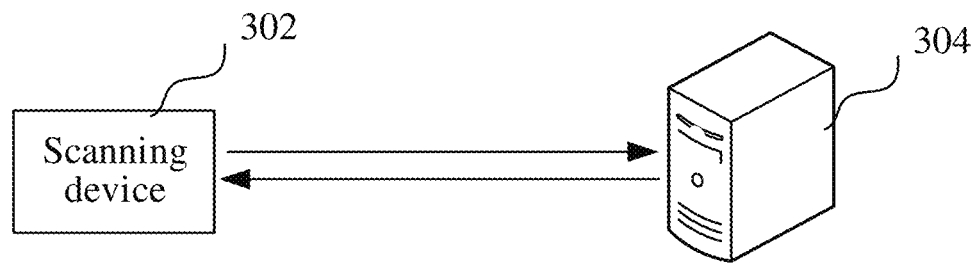
FIG. 3 is a diagram of an application environment of an identification code identification method according to an embodiment.
Figure 4:
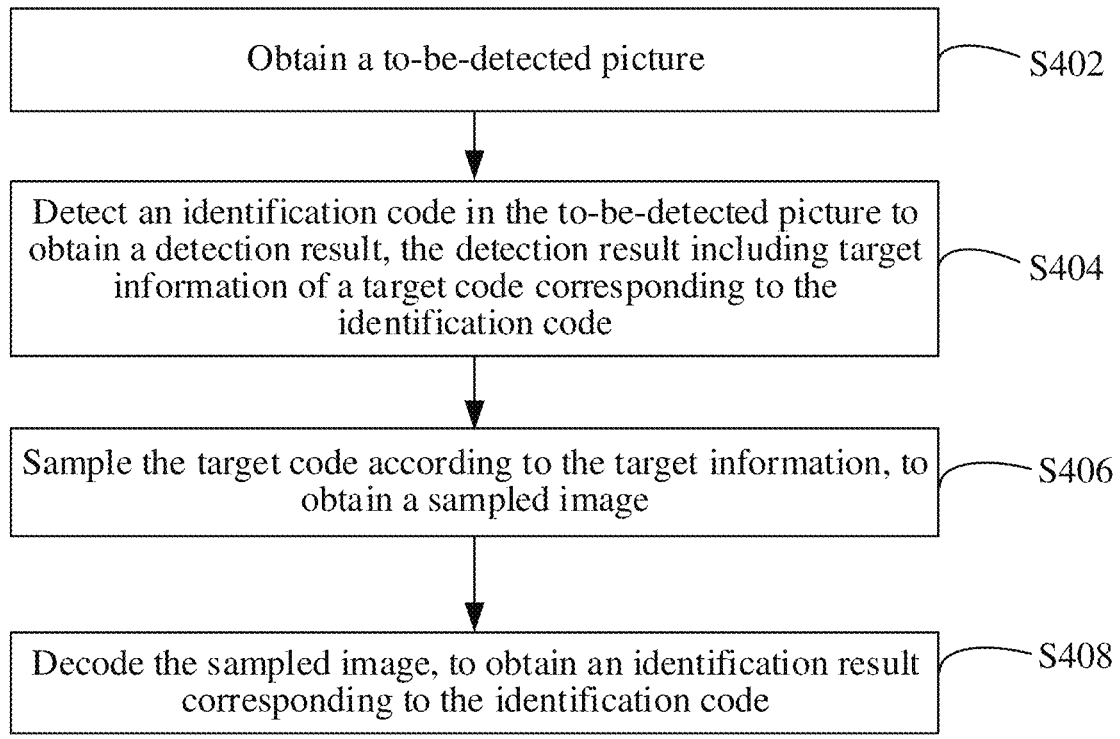
FIG. 4 is a schematic flowchart of an identification code identification method according to an embodiment.

In an embodiment, as shown in FIG. 4, an identification code identification method is provided, and the method may run in the computer device 304 in FIG. 3. The identification code identification method include the following steps:

S402. A computer device obtains a to-be-detected picture.

The to-be-detected picture is a picture including an identification code.

The to-be-detected picture may be obtained in a scanning or photo-taking manner; or the to-be-detected picture may be obtained by picture setting. In a possible implementation, picture setting may include setting a picture as the to-be-detected picture, wherein the picture may include a picture stored locally, a picture browsed on the Internet (or obtained from the internet), a picture sent/shared from a person (e.g., a friend in a social platform), or the like.

The to-be-detected picture may be a relatively large picture, and the identification code occupies a relatively small proportion in the to-be-detected picture, that is, a case of a large image and a small code. For the to-be-detected picture in the case of a large image and a small code, the identification efficiency of the identification code in the to-be-detected picture is improved to larger extent.

S404. The computer device detects an identification code in the to-be-detected picture to obtain a detection result, the detection result including target information of a target code corresponding to the identification code.

The identification code may be a two-dimensional code, a one-dimensional code (or may be referred to as a barcode), an applet code, a PDF417 barcode, or the like, which is not specifically limited in the embodiments of this application. The PDF417 barcode is a portable data format with a high density and high information content. The PDF417 barcode may be used for implementing automatic storage and carrying of large-capacity and high-reliability information such as certificates and cards and may be automatically read by a machine.

The target code is detected by the computer device, and is identified as the identification code by the computer device. It may be understood that, the target code identified as the identification code and an actual identification code may not completely coincide, but an intersection-over-union ratio between the target code and the identification code needs to be greater than a preset value. In one implementation, the intersection-over-union ratio may be a ratio of an intersection of the target code and the identification code to a union of the target code and the identification code. In another possible implementation, the preset value is not less than 0.5. When the intersection-over-union ratio between the target code and the identification code is 1, it indicates that the detected target code and the identification code completely coincide. The intersection-over-union ratio is usually a concept used in target detection, and refers to an overlap rate of a generated candidate box to an original marker box, that is, a ratio of an intersection to a union of the generated candidate box and an original marker box. In the embodiments of this application, the intersection-over-union ratio refers to a ratio of an intersection to a union of the target code and the identification code.

The target information may include position information of the target code in the to-be-detected picture. Optionally, the target information may include image information of the target code. In a possible implementation, the image information may refer to information of each pixel point (or simply each pixel) of the target code.

In a possible implementation, the manner for detecting the identification code in the to-be-detected picture to obtain the detection result may be: performing detection by using the identification code as a target through a target detection algorithm, to obtain the detection result including the target information of the target code corresponding to the identification code. In one implementation, the target detection algorithm may be implemented through a neural network. For example but not limited to, the target detection algorithm may be implemented through a discrete phase model (DPM).

S406. The computer device samples the target code according to the target information, to obtain a sampled image.

In this embodiment, there is no need to sample the entire to-be-detected picture, but only the target code corresponding to the target information obtained through detection needs to be sampled. In this way, the obtained sampled image can reduce interference on a non-identification code region to a large extent.

In a possible implementation, the sampling manner includes performing original image sampling in the proportion 1:1, or may include performing upsampling in the proportion 1:n, or may include performing downsampling in the proportion n: 1. For example, for ¼ downsampling in 4:1, one point (or pixel) is taken from four pixel points (or four pixels); or for ¹⁄₁₆ downsampling in 16:1, one point (or pixel) is taken from 16 pixel points (or 16 pixels).

S408. The computer device decodes the sampled image, to obtain an identification result corresponding to the identification code.

After the target code is sampled, the sampled image obtained through sampling may be decoded by a decoder, to obtain the identification result of the identification code corresponding to the target code. The decoder may include a one-dimensional code decoder, a two-dimensional code decoder, an applet code decoder, a PDF417 barcode decoder, or the like. The identification result corresponding to the identification code is a decoding result obtained by decoding the target code. For example, when the identification code is a two-dimensional code, the decoding result may include information carried in the two-dimensional code; and when the identification code is an applet code, the decoding result may include applet information corresponding to the applet code.

It may be understood that, a sampled image corresponding to one target code may include a plurality of pictures in different sampling proportions. For example, the sampled image may include one 1:1 original image, one 1:2 upsampled image, and one 4:1 downsampled image. In another example, the sampled image may include one 1:1 original image, one 4:1 downsampled image, and one 16:1 downsampled image.

In the foregoing identification code identification method, after obtaining a to-be-detected picture, the computer device first detects an identification code in the to-be-detected picture, to obtain a detection result, the detection result including target information of a target code corresponding to the identification code; then samples the target code according to the target information, to obtain a sampled image; and finally, decodes the sampled image to obtain an identification result corresponding to the identification code. After obtaining the to-be-detected picture, the computer device does not directly perform sampling and decoding operations on the entire to-be-detected picture. Instead, the computer device first detects the entire picture, to obtain the detection result for the identification code, the detection result including the target information of the target code corresponding to the identification code. Then, the computer device performs the sampling and decoding operations on the target code. In this way, interference on a non-identification code region in the to-be-detected picture can be reduced, and the identification efficiency of the identification code can be improved.

Figure 5:
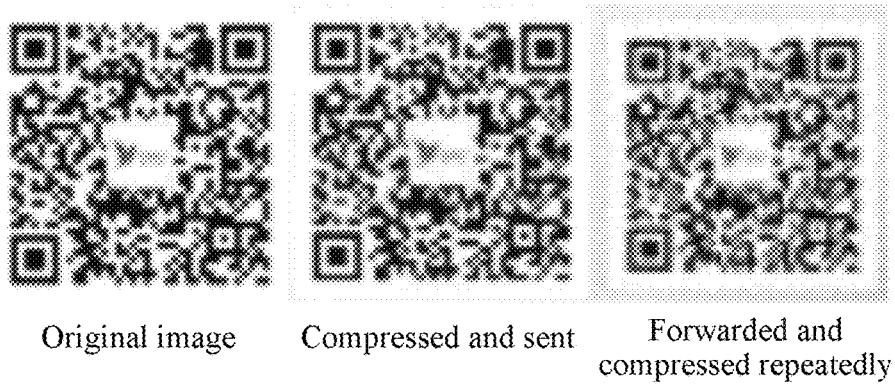
FIG. 5 is a comparison diagram among an original image, an image obtained by forwarding and compressing the original image, and an image obtained by forwarding and compressing the original image repeatedly in an example.

For a scenario in which a picture forwarded and compressed repeatedly is set to a to-be-detected picture, 30% of identification failure cases are selected to be analyzed, and it is found that in the identification failure cases, there are 70% cases in which the decoding failure is caused by an excessively small identification code that is further compressed, which finally leads to the identification failure. As shown in FIG. 5, limited by factors such as the traffic, when forwarding a picture, a user usually needs to compress the picture. The picture forwarded and compressed repeatedly has a relatively low resolution, which causes decoding failures in the subsequent decoding process through the original image sampling and downsampling manners, finally leading to the identification failure. This phenomenon is also referred to as compression artifact.

In an embodiment, the sampling the target code according to the target information, to obtain a sampled image includes: upsampling the target code according to the target information in a case that the target code meets a resolution condition, to obtain the sampled image.

In a possible implementation, the resolution condition may be that the resolution is less than a preset value. For example, the resolution is less than 300 dpi*300 dpi, or 400 dpi*400 dpi, where dpi represents dots per inch. For another example, the resolution may include a number of pixels, and the preset value may be 300 pixel*300 pixel, or 400 pixel*400 pixel. The resolution condition may be that the resolution is less than 300 pixel*300 pixel, or 400 pixel*400 pixel.

In another possible implementation, the resolution condition may alternatively be that the resolution is within a preset range. For example, the resolution is greater than 200 dpi*200 dpi and less than 300 pdi*300 pdi, or the resolution is greater than 180 dpi*200 dpi and less than 400 dpi*400 dpi. For another example, the resolution may include a number of pixels, and the preset range may be greater than 180 pixel*200 pixel and less than 400 pixel*400 pixel.

Upsampling is inserting a new element between pixels based on original image pixels, so that the obtained sampled image is clearer than the original image. Generally, the new element may be inserted by using an interpolation algorithm, which is not specifically limited in the embodiments of this application.

Based on the identification code identification method of this embodiment, only when the target code meets the resolution condition, the target code needs to be upsampled according to the target information, to obtain the sampled image. In this way, on one hand, a waste of resources caused by still performing upsampling when the resolution does not meet the resolution condition, for example, when the resolution is high enough can be avoided. On the other hand, the method may be more applicable to the scenario in which a picture forwarded and compressed repeatedly is set to a to-be-detected picture. Therefore, based on the identification code identification method of this embodiment, system resources can be saved on the basis of ensuring the identification efficiency of the identification code.

In an embodiment, the target code is upsampled according to the target information in a case that a resolution of the target code is less than a preset value, to obtain the sampled image. In this way, a target code with a relatively low resolution is upsampled, to resolve the problem of decreased identification efficiency resulting from relatively low resolution, thereby improving the identification efficiency of the identification code.

Correspondingly, when the resolution of the target code is greater than another preset value, the target code may be downsampled according to the target information, to obtain the sampled image. It may be understood that, the another preset value is greater than the foregoing preset value. In this way, the target code with an excessively high resolution is downsampled, to decrease the quantity of pixels that need to be identified, thereby improving the identification efficiency of the identification code.

It may be understood that, when the resolution of the target code is between a first preset value and a second preset value, 1:1 original image sampling is performed on the target code according to the target information. In this way, the target code with the suitable resolution does not need to be upsampled or downsampled. In one implementation, the first preset value is smaller than the second preset value.

Based on the identification code identification method of this embodiment, the sampling manner is determined according to the resolution of the target code, the target code does not need to be sampled in various manners, and fewer sampled images are obtained. The sampling manner includes upsampling, downsampling, and original image sampling. The quantity of the sampled images may be a preset quantity, and the preset quantity may at least be 1. In this way, the sampling time may be decreased, and the quantity of decoded sampled images may be decreased, thereby improving the identification efficiency of the identification code.

In an embodiment, the step of obtaining the to-be-detected picture includes either of the following two manners:

(1) Obtain the to-be-detected picture by picture setting.

(2) Obtain the to-be-detected picture by scanning.

The obtaining the to-be-detected picture by picture setting may be setting a preset picture to the to-be-detected picture through a preset instruction. The preset picture may be a picture displayed currently, or may be a picture stored or displayed recently. The picture displayed currently may be a local picture, or may be a picture browsed on the Internet; and the picture displayed recently may be a local picture, or may be a picture browsed on the Internet.

The preset instruction may be triggered through a function menu to set the preset picture to the to-be-detected picture, or the preset picture may be set to the to-be-detected picture through a preset action. For example, the picture displayed recently is set to the to-be-detected picture through a circling action on the screen. It may be understood that, the preset action may be a screen action such as circling or making a preset pattern on the screen, or may be a button action such as pressing a preset button, or may be a combination of a screen action and a button action, which is not specifically limited in the embodiments of this application.

The obtaining the to-be-detected picture by picture setting is different from the obtaining the to-be-detected picture by scanning. The manner for obtaining the to-be-detected picture by picture setting may be generally obtaining one picture. Therefore, when an identification code of the picture is identified, the resolution of the picture needs to be ensured, thereby improving the identification efficiency of the identification code.

The obtaining the to-be-detected picture by scanning may be obtaining the to-be-detected picture by scanning an identification code by using a scanning device, or obtaining the to-be-detected picture by acquiring an image of an identification code by using a camera device. A plurality of pictures may be obtained by scanning. The identification code may be identified by combining the plurality of pictures. Therefore, the resolution requirement on the plurality of pictures may be lower, and the identification efficiency of the identification code can be ensured, thereby improving the applicability of the identification code identification.

In an embodiment, if the to-be-detected picture is obtained by picture setting, the identification code in the to-be-detected picture is detected by using a first resolution, to obtain the detection result; and if the to-be-detected picture is obtained by scanning, the identification code in the to-be-detected picture is detected by using a second resolution, to obtain the detection result, the first resolution being greater than the second resolution.

In this way, it is ensured that the resolution of the target code corresponding to the to-be-detected picture obtained by picture setting is greater than the resolution of the target code corresponding to the to-be-detected picture obtained by scanning, thereby improving the applicability of the identification code identification on the basis of ensuring the identification efficiency of the two manners.

In an embodiment, because the method of obtaining the to-be-detected picture obtained by picture setting requires a high precision and is time-consuming, the first resolution may be 400 dpi*400 dpi to improve the identification efficiency. For the to-be-detected picture obtained by scanning, the second resolution may be 300 dpi*300 dpi.

In an embodiment, if the to-be-detected picture is obtained in a manner of setting a local picture, the sampling the target code according to the target information, to obtain a sampled image includes: upsampling the target code according to the target information in a case that the target code meets a resolution condition, to obtain the sampled image.

Because obtaining the to-be-detected picture by scanning requires a higher resolution than obtaining the to-be-detected picture by picture setting, in this embodiment, in a case that the to-be-detected picture is obtained by picture setting, if the target code meets the resolution condition, the target code is upsampled according to the target information, to obtain the sampled image. In this way, the resolution of the sampled image is ensured in a case that the to-be-detected picture is obtained by picture setting, thereby improving the identification efficiency of the identification code.

In an embodiment, the upsampling the target code according to the target information, to obtain the sampled image is performing bilinear interpolation on every four adjacent pixels in the target code according to the target information, to obtain the sampled image.

That is, in this embodiment, an interpolation algorithm used in the upsampling may be a bilinear interpolation algorithm. The bilinear interpolation is a linear interpolation extension of an interpolation function of two variables. In a possible implementation, the bilinear interpolation manner may be performing one linear interpolation in two directions separately. One linear interpolation is performed on every four adjacent pixels in the target code in two directions separately, to obtain a bilinear interpolation result. In this way, the accuracy of the sampled image is improved, and the decoding difficulty is reduced, thereby improving the identification efficiency of the identification code.

In an embodiment, the upsampling the target code according to the target information, to obtain the sampled image is upsampling the target code based on an image super-resolution reconstruction technology, to obtain the sampled image.

That is, the target code is upsampled based on the image super-resolution reconstruction technology and according to the target information, to obtain the sampled image. The image super-resolution reconstruction technology means using target codes of a group of low-quality and low-resolution images (or motion sequences), to generate a sampled image of a high-quality and high-resolution image. In this way, the quality and the resolution of the sampled image can be improved, thereby improving the identification efficiency of the identification code.

Figure 6:
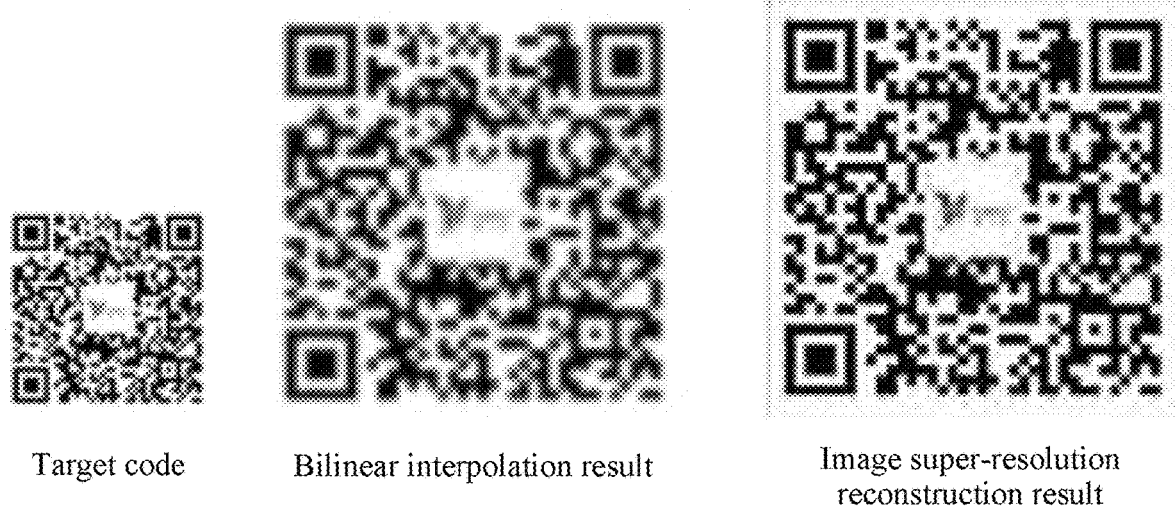
FIG. 6 is a comparison diagram between a result obtained by performing bilinear interpolation on a target code and an image super-resolution reconstruction result in an example.

Generally, as shown in FIG. 6, compared with the manner for performing bilinear interpolation on every four adjacent pixels in the target code according to the target information, in the manner for upsampling the target code based on the image super-resolution reconstruction technology, the obtained sampled image has a higher resolution.

In various implementations, to ensure the accuracy of the upsampling to improve the identification efficiency, the target code may be upsampled based on the image super-resolution reconstruction technology and through a neural network model, to obtain the sampled image. In a possible implementation, the neural network model may be at least one of the following: a deep neural network model, a convolutional neural network model, or a recurrent neural network. For example but not limited to, the neural network model may be a Fast Region-based Convolutional Network (FSRCNN), a shuffle network (ShuffleNet, which is a lightweight neural network), or a dense network (DenseNet).

Further in some implementations, because the texture/characteristics of the identification code is relatively simple, the neural network model for upsampling the target code based on the image super-resolution reconstruction technology may be a lightweight neural network model. In a training process of the lightweight neural network model, a loss function is related to an identification success rate. For example, when the identification success rate is greater than a preset value, the model achieves the optimal effect. Compared with the implementation in which the loss function is related to a Peak Signal to Noise Ratio (PSNR), the model is smaller, and the running time may be reduced, thereby further improving the identification efficiency of the identification code.

In an embodiment, a weight corresponding to an edge region of the target code in a hidden layer of the neural network model is greater than a preset value.

The neural network model may include an input layer, an output layer, and one or more hidden layer connected between the input layer and the output layer. The quantity of the hidden layers may be not less than 1. The hidden layer may include a weight corresponding to each feature region in the target code. Because for the object of the identification code, whether the edge region is clear is highly related to the identification efficiency, and the weight corresponding to the edge region of the target code in the hidden layer of the neural network model is greater than the preset value, the definition of the edge region may be improved. In a possible implementation, the preset value may be an average value of region weights, or may be a fixed value, or may be a value determined according to a preset manner. The preset manner includes performing weighted summation or averaging on weight values corresponding to preset regions. In this way, the definition of the edge region is improved, thereby improving the identification efficiency.

In an embodiment, in a process of training the neural network, when the loss function is calculated, edge information of the target code may be extracted by using an edge detection algorithm, and the weight corresponding to the edge region is improved appropriately, so that the weight corresponding to the edge region of the target code in the hidden layer of the neural network model is greater than the preset value, thereby improving the identification efficiency. In an example, the edge detection algorithm may be a Sobel edge detection algorithm, which is not specifically limited in the embodiments of this application.

Figure 7:
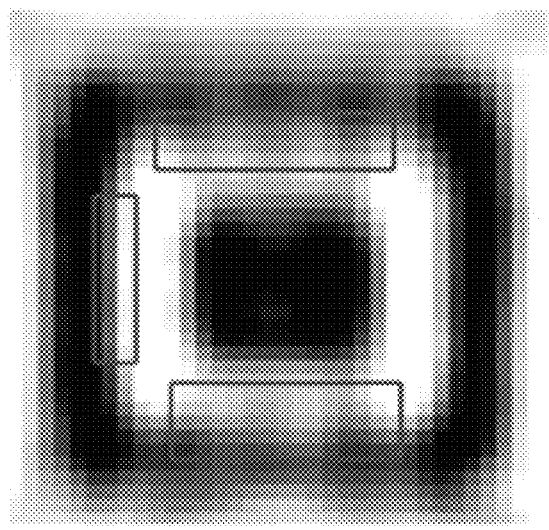
FIG. 7 is a comparison diagram between a sampled image obtained in an identification manner provided in the related art and a sampled image obtained in an embodiment.
Figure 7:
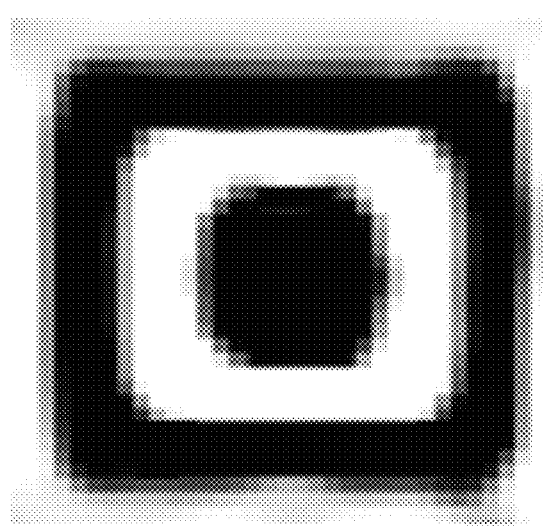

In an embodiment, by using the neural network model in which the weight corresponding to the edge region of the target code is greater than the preset value, upsampling is performed, to obtain the sampled image. The obtained sampled image is compared with a sampled image obtained in the related art, as shown in FIG. 7. The definition of the sampled image obtained by performing sampling by using the neural network model in which the weight corresponding to the edge region of the target code is greater than the preset value is obviously greater than that of the sampled image obtained in the related art, for example, the part outlined by the rectangular box in the image obtained in the related art. Therefore, the manner for obtaining the sampled image by performing upsampling by using the neural network model in which the weight corresponding to the edge region of the target code is greater than the preset value can improve the identification efficiency of the identification code.

In an embodiment, a logo region of a target code in a training sample is filtered before the neural network model is trained.

The identification code may have some information without a substantial decoding meaning. For example, there may be a logo in the center of a two-dimensional code. To reduce the interference in the decoding process, the logo region in the training sample may be filtered out. In an example, the filter-out manner may be obtaining a logo region position, and then setting the logo region to a blank form according to the logo region position; or the logo region may be removed manually, which is not specifically limited in the embodiments of this application. Because the interference in the decoding process can be reduced, the decoding efficiency can be improved, thereby improving the identification efficiency of the identification code.

In an embodiment, a dense network is used as a network model, and the network is simplified while ensuring the identification rate. The size of the final model is 13 Kilobytes (K), and for a to-be-detected picture whose identification code is 100 dpi*100 dpi, the consumed time is 6 ms.

In an embodiment, the detection result further includes an identification code type. The decoding the sampled image, to obtain an identification result corresponding to the identification code includes: decoding the sampled image according to the identification code type, to obtain the identification result corresponding to the identification code.

The identification code type may include a two-dimensional code, a one-dimensional code (or may be referred to as a barcode), an applet code, a PDF417 barcode, or the like. Because each type of identification code may correspond to a decoder, in a case that the identification code type is not determined, decoding needs to be performed by using various types of decoders, and a decoding result corresponding to a decoder that performs decoding successfully is used as a final decoding result. For example, the one-dimensional code is decoded by using a one-dimensional code decoder, the two-dimensional code is decoded by using a two-dimensional decoder, the applet code is decoded by using an applet decoder, and the PDF417 barcode is decoded by using a PDF417 barcode decoder. Therefore, based on the identification code identification method of this embodiment, the identification code type is determined before the decoding, during the decoding, decoding may be performed only by using a decoder corresponding to the identification code type, instead of decoding by using each decoder, thereby further improving the decoding efficiency, and further improving the identification efficiency of the identification code.

To further improve the detection efficiency for detecting the identification code in the to-be-detected picture, in an embodiment, the identification code in the to-be-detected picture is detected by using the neural network model, to obtain the detection result.

In an example, the neural network model may be a Convolutional Neural Network (CNN), Regions with CNN features (RCNN), Fast Regions with CNN features (FastRCNN), Faster Regions with CNN features (FasterRCNN), or the like. By using the neural network model, a more accurate detection result can be obtained, thereby improving the identification efficiency of the identification code.

To be more applicable to a mobile scenario, that is, to be conveniently used in a mobile terminal, the neural network model may use a Single Shot multibox Detector (SSD) algorithm. Further, on the basis of the SSD algorithm, improvement may be made based on a high-concurrency convolutional neural network (HcNet), the good implementation of a depthwise separable convolution in an ncnn framework (Tencent open source deep learning framework) is used for transforming all 3×3 convolutions in a network residual into depthwise separable convolutions, and a relatively small network coefficient in a plurality of experiments is selected. In this way, the neural network model is smaller, and less time is consumed, thereby further improving the identification efficiency of the identification code.

Based on the solution of this embodiment, finally, the basic network size of the BoxNet (box network) pre-trained in the ImageNet (image network) is only 3M, the accuracy of the detection result ranked first in detection results, that is, the Top-1 accuracy, reaches 56%, the algorithm effect is the same as that of the AlexNet, the model size of the AlexNet is about 200 M, and the calculation amount is more than ten times larger.

Figure 8:
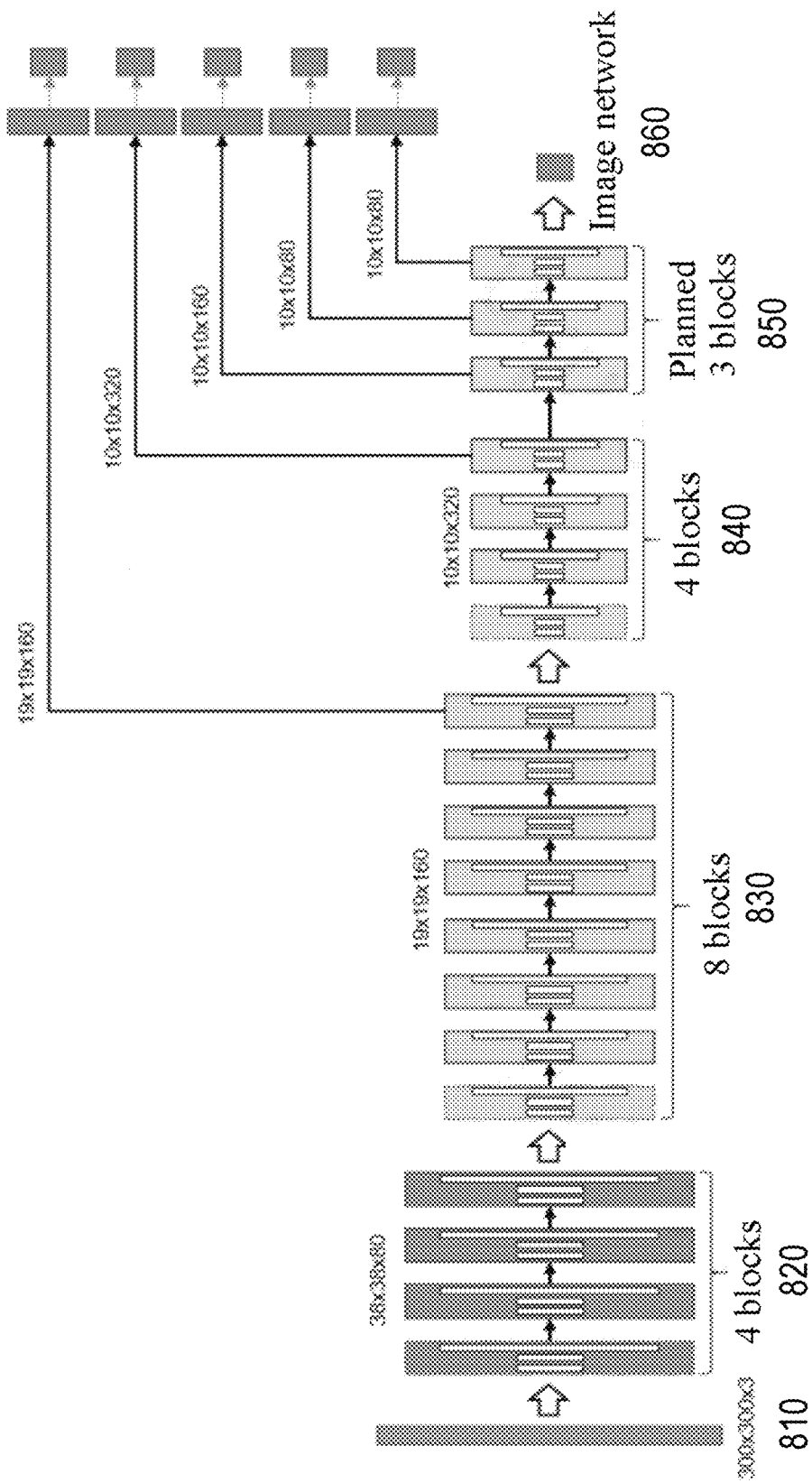
FIG. 8 is a schematic structural diagram of a box network used in an identification code identification method according to an embodiment.

In an embodiment, as the schematic structural diagram of the BoxNet shown in FIG. 8, convolution is performed on a three-channel 300 dpi*300 dpi image 810 to obtain four 80-channel 38 dpi*38 dpi images 820; the convolution operation continues to be performed, to obtain eight 160-channel 19 dpi*19 dpi images 830; the convolution operation continues to be performed, to obtain four 320-channel 10 dpi*10 dpi images 840; the convolution operation continues to be performed, to obtain three 80-channel 10 dpi*10 dpi images 850; and the convolution operation continues to be performed, to finally obtain the image network 860.

Then, the box network is further quantized. For example, if the to-be-detected picture is obtained by picture setting, the identification code in the to-be-detected picture is detected by using a first resolution, to obtain the detection result; and if the to-be-detected picture is obtained by scanning, the identification code in the to-be-detected picture by using a second resolution, to obtain the detection result, the first resolution being greater than the second resolution. Finally, in the box network based on the SSD algorithm, after 16 bits are quantized, the model size is 500 K, and the time consumed by detecting a single frame is only 15 ms.

In various embodiments/implementations, an intersection-over-union ratio between a target code and an identification code that correspond to a positive sample used in a training process of the neural network model is greater than a preset value. In one implementation, the positive sample may include good samples for training.

Because an incomplete identification code cannot be decoded after being detected, the identification code detection has a higher requirement on the integrity compared with the ordinary target detection. Therefore, in the training process, the identification code in the positive sample needs to more strictly ensure the integrity. During sampling of a data enhanced sample, a minimum object coverage in the positive sample needs to be strictly limited, and the target code in the sampled image needs to include the entire identification code as much as possible.

In this embodiment, by setting the intersection-over-union ratio between the target code and the identification code that correspond to the positive sample in the training process to be greater than the preset value, the intersection-over-union ratio between the target code and the identification code that correspond to the positive sample is improved. The intersection-over-union ratio may be a ratio of an intersection of the target code and the identification code to an union of the target code and the identification code that correspond to the positive sample, that is, a ratio of an intersection between the target code and the identification code that correspond to the positive sample to a union between the target code and the identification code. In a possible implementation, the ratio of the intersection to the union may be a ratio of the area of the intersection to the area of the union. In another implementation, the intersection-over-union ratio may be a ratio of the quantity of pixels of the intersection to the quantity of pixels of the union. In this way, the weight value corresponding to the integrity of the identification code in the neural network model is improved, thereby improving the identification efficiency of the identification code.

In an embodiment, the decoding the sampled image, to obtain an identification result corresponding to the identification code includes: performing binarization processing on the sampled image, to obtain a binary image; and decoding the binary image, to obtain the identification result corresponding to the identification code.

The binarization processing is setting a grayscale value of a pixels on the sampled image to one of two values, where the two values may be 0 or 255. In this way, the obtained binary image presents an obvious black and white effect. The binarization manner may include mixed binarization, quick window binarization, and adaptive binarization. Because the objective of this application is to identify an identification code, and the identification of the identification code may only involve identification of a black and white image. Therefore, the binarization processing is performed before decoding, and the decoding efficiency can be improved during the decoding, thereby improving the identification efficiency of the identification code.

In an embodiment, first, a to-be-detected picture is obtained by scanning. Then, an identification code in the to-be-detected picture is detected through a neural network model, to obtain a detection result, an intersection-over-union ratio between a target code and an identification code that correspond to a positive sample used in a training process of the neural network model being greater than a preset value. Finally, the target code is sampled according to target information, to obtain a sampled image, and the sampled image is decoded, to obtain an identification result corresponding to the identification code. In a possible implementation, scanning may be performed based on a scanning entrance provided by an application, to obtain the to-be-detected picture. The foregoing application includes, but is not limited to, a social application, a payment application, or the like, which is not specifically limited in the embodiments of this application.

In a further detailed embodiment, the sampling the target code according to the target information, to obtain a sampled image includes: performing bilinear interpolation on every four adjacent pixels in the target code according to the target information in a case that the target code meets a resolution condition, to obtain the sampled image.

Figure 9:
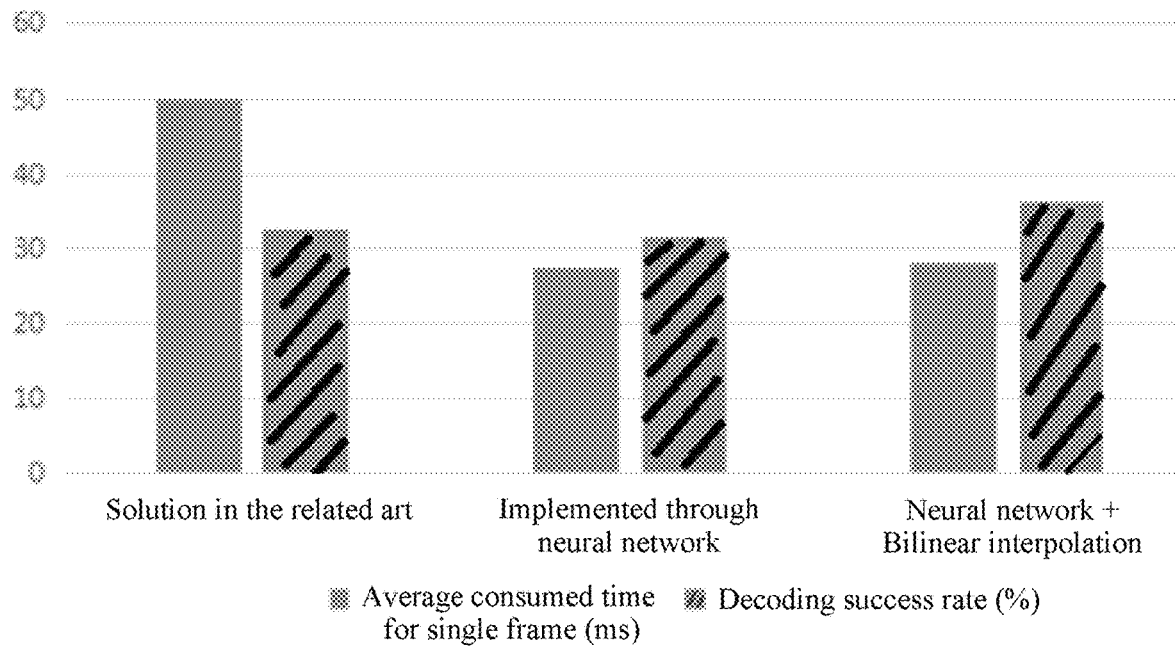
FIG. 9 is an effect comparison diagram between the identification code identification methods in the two embodiments and the solution provided in the related art.

A comparison diagram between the effects of the two embodiments and the identification manner in the related art is shown in FIG. 9. Based on the solution of the former embodiment, during the identification of the identification code, in a case that a relatively small decoding success rate is reduced, the average consumed time for a single frame is decreased by about 150%. Therefore, the identification efficiency is higher than that of the identification solution provided in the related art. Based on the solution of the latter embodiment, in a case that less consumed time for a single frame is increased compared with the former embodiment, the decoding success rate is increased from about 32% to about 36%.

In another embodiment, first, a to-be-detected picture is obtained by picture setting. Then, an identification code in the to-be-detected picture is detected through a neural network model, to obtain a detection result, an intersection-over-union ratio of a target code and an identification code that correspond to a positive sample used in a training process of the neural network model being greater than a preset value. Finally, the target code is sampled according to target information, to obtain a sampled image, and the sampled image is decoded, to obtain an identification result corresponding to the identification code. In a possible implementation, the picture setting manner may be a press and hold operation on the picture, that is, the operation of the user pressing and holding the picture may trigger the computer device to obtain the to-be-detected picture, which is not specifically limited in the embodiments of this application.

In a further embodiment, the sampling the target code according to target information, to obtain a sampled image includes: upsampling the target code based on an image super-resolution reconstruction technology and according to the target information in a case that the target code meets a resolution condition, to obtain the sampled image.

Figure 10:
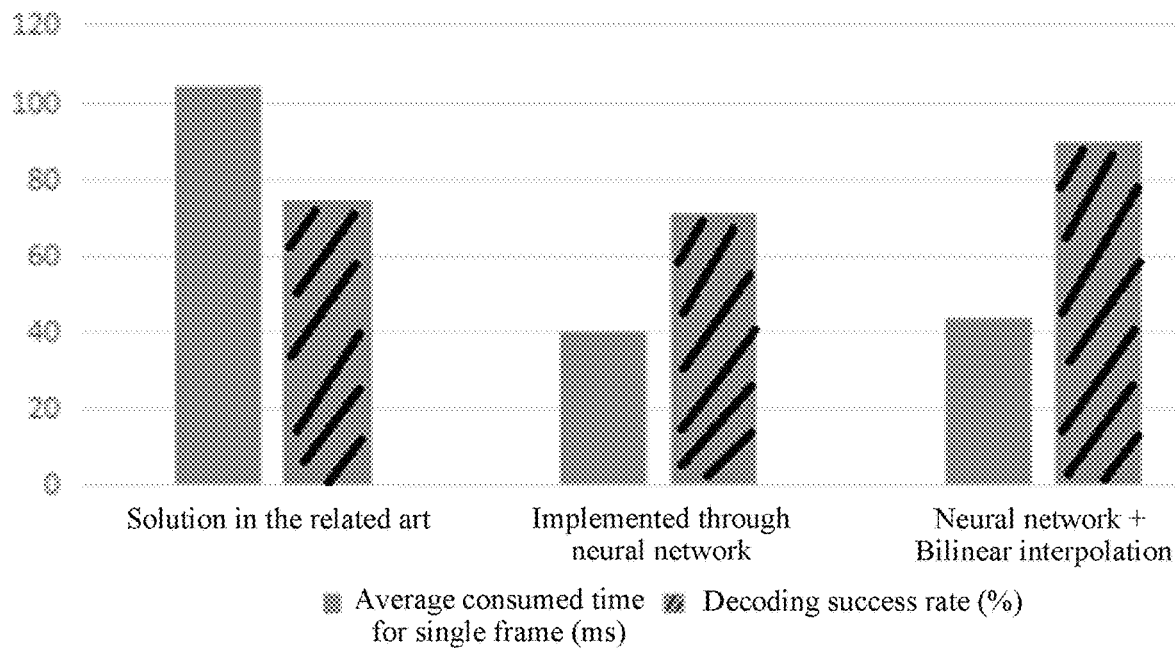
FIG. 10 is an effect comparison diagram between the identification code identification methods in the other two embodiments and the solution provided in the related art.

A comparison diagram between the effects of the two embodiments and the identification manner in the related art is shown in FIG. 10. Based on the solution of the former embodiment, during the identification of the identification code, in a case that a relatively small decoding success rate is reduced, the average consumed time for a single frame is decreased by about 150%. Therefore, the identification efficiency is higher than that of the identification solution provided in the related art. Based on the solution of the latter embodiment, in a case that less consumed time for a single frame is increased compared with the former embodiment, the decoding success rate is increased from about 70% to about 90%.

Figure 11:
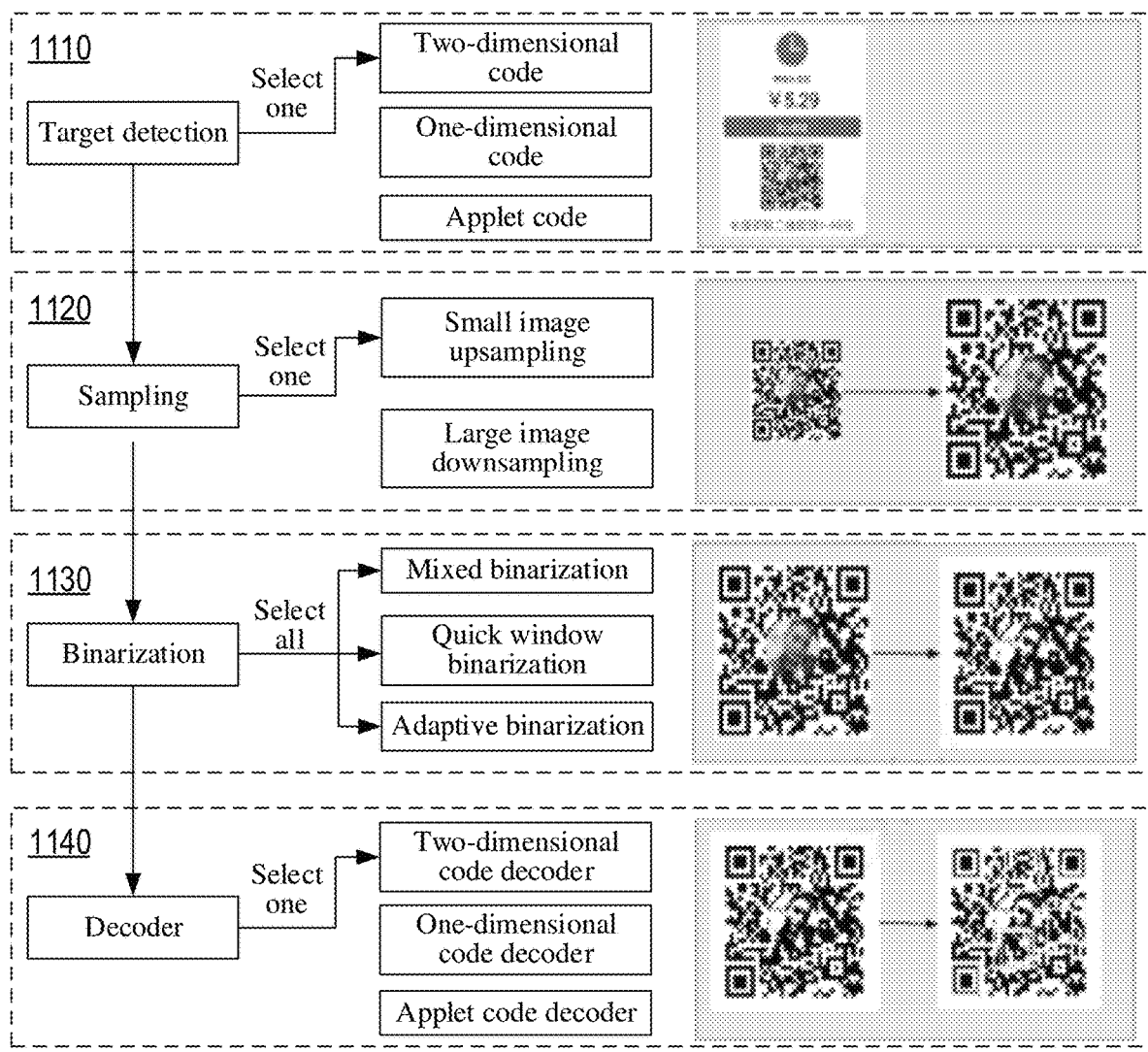
FIG. 11 is a schematic flowchart according to an embodiment.

In an embodiment, as shown in FIG. 11, after the to-be-detected picture is obtained, the identification code in the to-be-detected picture is detected to obtain a detection result, the detection result including the target information of the target code corresponding to the identification code and an identification code type, and the identification code type including a two-dimensional code, a one-dimensional code, and an applet code (1110). The target code is upsampled according to the target information in a case that the target code meets a resolution condition, to obtain the sampled image (1120). Then, binarization processing is performed on the sampled image, to obtain a binary image; and the binarization processing includes mixed binarization, quick window binarization, and adaptive binarization (1130). Finally, the binary image is decoded by using a decoder corresponding to the identification code type (1140).

Before the sampling, the identification code is detected to obtain the detection result including the target information and the identification code type. Therefore, during the sampling and the binarization, there is no need to process the entire to-be-detected picture, and during the decoding, the decoding is performed by only using the decoder corresponding to the identification code type. Therefore, the identification efficiency of the identification code can be improved.

It is to be understood that although each step of the flowchart in FIG. 4 is displayed sequentially according to arrows, the steps are not necessarily performed according to an order indicated by arrows. Unless explicitly specified in this application, the sequence for performing the steps is not strictly limited, and the steps may be performed in other sequences. Moreover, at least some of the steps in FIG. 4 may include a plurality of sub-steps or a plurality of stages. These sub-steps or stages are not necessarily performed at the same moment, but may be performed at different moments. These sub-steps or stages are not necessarily executed sequentially, but may be performed in turn or alternately with at least some of the other steps or sub-steps or stages of other steps.

Figure 12:
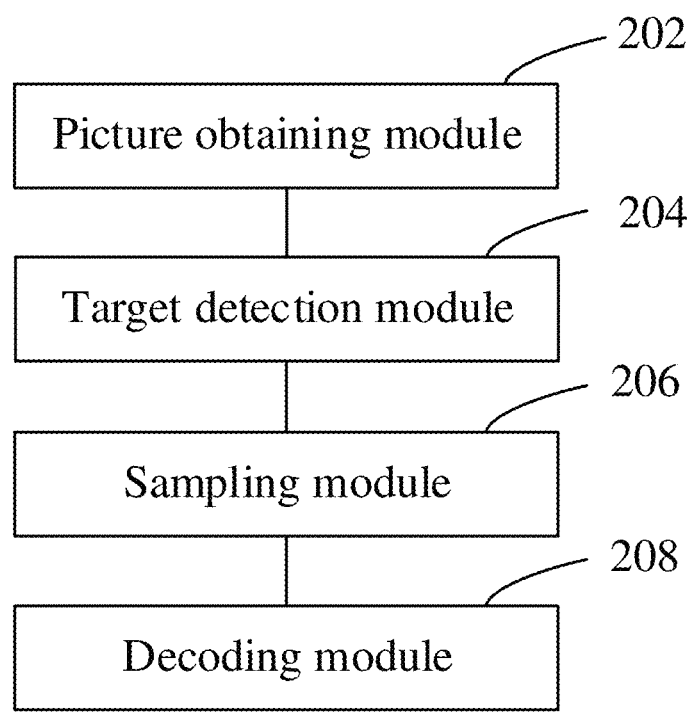
FIG. 12 is a structural block diagram of an identification code identification apparatus according to an embodiment.

In an embodiment, as shown in FIG. 12, an identification code identification apparatus running in the computer device 304 in FIG. 3 is provided, including: a picture obtaining module 202, configured to obtain a to-be-detected picture; a target detection module 204, configured to detect an identification code in the to-be-detected picture to obtain a detection result, the detection result including target information of a target code corresponding to the identification code; a sampling module 206, configured to sample the target code according to the target information, to obtain a sampled image; and a decoding module 208, configured to decode the sampled image, to obtain an identification result corresponding to the identification code. In the present disclosure, "module" may be refer to hardware, software, or a combination of hardware and software. When a module includes hardware, the module may include one or more processor, and/or one or more memory storing instructions, wherein the processor may be in communication with the memory and execute the instructions. When a module includes software, the module may be configured to perform one or more specific functions.

In the foregoing identification code identification apparatus, after a to-be-detected picture is obtained, an identification code in the to-be-detected picture is first detected, to obtain a detection result, the detection result including target information of a target code corresponding to the identification code; then the target code is sampled according to the target information, to obtain a sampled image; and finally, the sampled image is decoded to obtain an identification result corresponding to the identification code. After the to-be-detected picture is obtained, operations such as sampling and decoding are not performed directly on the entire to-be-detected picture. Instead, the entire picture is detected first, to obtain the detection result for the identification code, the detection result including target information of a target code corresponding to the identification code. Then, the operations such as sampling and decoding are performed on the target code. In this way, interference on a non-identification code region in the to-be-detected picture can be reduced, thereby improving the identification efficiency of the identification code.

In an embodiment, the sampling module is configured to upsample the target code according to the target information in a case that the target code meets a resolution condition, to obtain the sampled image.

In an embodiment, the sampling module is configured to: if the to-be-detected picture is obtained by picture setting, upsample the target code according to the target information in a case that the target code meets a resolution condition, to obtain the sampled image.

In an embodiment, the sampling module is configured to upsample the target code according to the target information in a case that a resolution of the target code is less than a preset value, to obtain the sampled image.

In an embodiment, the sampling module is configured to perform bilinear interpolation on every four adjacent pixels in the target code according to the target information, to obtain the sampled image.

In an embodiment, the sampling module is configured to upsample the target code based on an image super-resolution reconstruction technology and according to the target information, to obtain the sampled image.

Further, the target code is upsampled based on the image super-resolution reconstruction technology and through a neural network model, to obtain the sampled image, a weight corresponding to an edge region of the target code in a hidden layer of the neural network model being greater than a preset value.

In an embodiment, the apparatus further includes a filtering module, configured to filter a logo region of a target code in a training sample before the neural network model is trained.

In an embodiment, the picture obtaining module is configured to obtain the to-be-detected picture by picture setting.

In an embodiment, the picture obtaining module is configured to obtain the to-be-detected picture by scanning.

In an embodiment, the picture obtaining module is configured to obtain the to-be-detected picture by picture setting; and the target detection module is configured to detect the identification code in the to-be-detected picture by using a first resolution, to obtain the detection result.

In an embodiment, the picture obtaining module is configured to obtain the to-be-detected picture by scanning; and the target detection module is configured to detect an identification code in the to-be-detected picture by using a second resolution, to obtain the detection result.

The first resolution is greater than the second resolution.

In an embodiment, the detection result further includes an identification code type; and the decoding module is configured to decode the sampled image according to the identification code type, to obtain the identification result corresponding to the identification code.

In an embodiment, the apparatus further includes a binarization module; the binarization module is configured to perform binarization processing on the sampled image, to obtain a binary image; and the decoding module is configured to decode the binary image, to obtain the identification result corresponding to the identification code.

In an embodiment, the target detection module is configured to detect the identification code in the to-be-detected picture through a neural network model, to obtain the detection result, an intersection-over-union ratio between a target code and an identification code that correspond to a positive sample used in a training process of the neural network model being greater than a preset value.

In an embodiment, a computer device is provided. The computer device may be a server, and an internal structure diagram thereof may be shown in FIG. 13. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement an identification code identification method.

In an embodiment, a computer device is provided. The computer device may be a terminal, and an internal structure diagram thereof may be shown in FIG. 14. The computer device includes a processor, a memory, and a network interface, a display screen, and an input apparatus connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement an identification code identification method. The display screen of the computer device may be a liquid crystal display screen or an electronic ink display screen. The input apparatus of the computer device may be a touch layer covering the display screen, or may be a key, a trackball or a touch pad disposed on a housing of the computer device, and may further be an external keyboard, a touch pad, a mouse, or the like.

Figure 13:
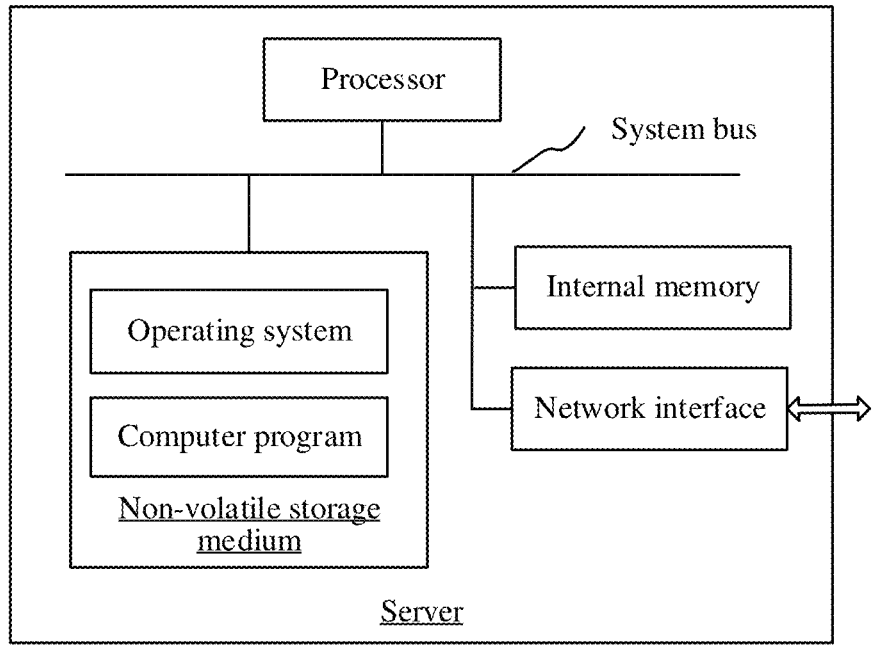
FIG. 13 is an internal structure diagram of a computer device according to an embodiment.
Figure 14:
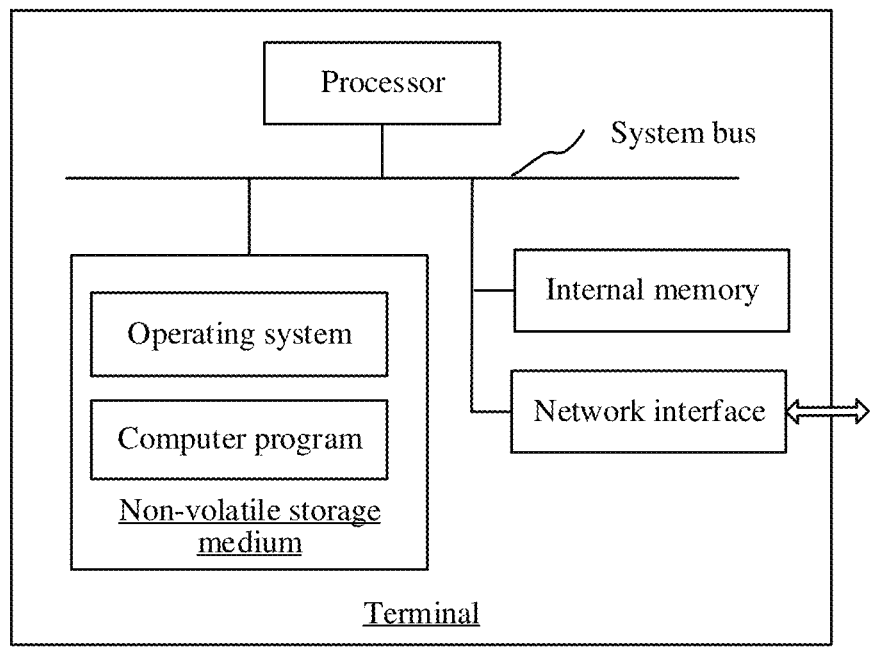
FIG. 14 is an internal structure diagram of a computer device according to another embodiment.

A person skilled in the art may understand that the structures shown in FIG. 13 and FIG. 14 are only block diagrams of a partial structure related to the solution of this application, and do not limit the computer device to which the solution of this application is applied. Specifically, the computer device may include more or fewer components than those shown in figures, or some components may be combined, or different component deployment may be used.

In an embodiment, a computer device is provided, including a memory and a processor, the memory storing a computer program, the computer program, when executed by the processor, causing the processor to perform the steps of the foregoing identification code identification method.

In an embodiment, a computer-readable storage medium is provided, storing a computer program, the computer program, when executed by a processor, causing the processor to perform the steps of the foregoing identification code identification method.

A person of ordinary skill in the art may understand that all or some of the processes of the methods in the embodiments may be implemented by a computer program instructing relevant hardware. The computer program may be stored in a non-volatile computer-readable storage medium. When the computer program is executed, the processes of the foregoing method embodiments are performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of this application, which are described specifically and in detail, but cannot be construed as a limitation to the patent scope of the present disclosure. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. A method for identifying an identification code in a to-be-detected picture, the method comprising:
    obtaining, by a computer device comprising a memory storing instructions and a processor in communication with the memory, a to-be-detected picture;
    detecting, by the computer device, an identification code in the to-be-detected picture to obtain a detection result comprising target information of a target code corresponding to the identification code by:
    detecting the identification code in the to-be-detected picture through a first neural network model, to obtain the detection result, an intersection-over-union ratio between the target code and the identification code being greater than a preset value, and the identification code corresponding to a positive sample used in a training process of the first neural network model;
    sampling, by the computer device, the target code according to the target information, to obtain a sampled image comprising:
        in response to the target code satisfying a resolution condition, upsampling, by the computer device, the target code based on an image super-resolution reconstruction technology and through a second neural network model, to obtain the sampled image, wherein a weight corresponding to an edge region of the target code in a hidden layer of the second neural network model is adjusted to be greater than a preset value; and
    decoding, by the computer device, the sampled image, to obtain an identification result corresponding to the identification code.

2. The method according to claim 1, wherein the sampling, by the computer device, the target code according to the target information, to obtain the sampled image comprises:
    in response to obtaining the to-be-detected picture by picture setting and the target code satisfying a resolution condition, upsampling, by the computer device, the target code according to the target information, to obtain the sampled image.

3. The method according to claim 1, further comprising:
    filtering, by the computer device, a logo region of a target code in a training sample before training the second neural network model.

4. The method according to claim 1, wherein the obtaining the to-be-detected picture comprises one of the following two manners:
    obtaining, by the computer device, the to-be-detected picture by picture setting; or obtaining, by the computer device, the to-be-detected picture by scanning.

5. The method according to claim 1, wherein:
the detection result further comprises an identification code type.

6. The method according to claim 5, wherein the decoding, by the computer device, the sampled image, to obtain the identification result corresponding to the identification code comprises:
decoding, by the computer device, the sampled image according to the identification code type, to obtain the identification result corresponding to the identification code.

7. A apparatus for identifying an identification code, the apparatus comprising:
a memory storing instructions; and
a processor in communication with the memory, wherein, when the processor executes the instructions, the processor is configured to cause the apparatus to perform operations comprising:
obtaining a to-be-detected picture,
detecting an identification code in the to-be-detected picture to obtain a detection result comprising target information of a target code corresponding to the identification code by:
detecting the identification code in the to-be-detected picture through a first neural network model, to obtain the detection result, an intersection-over-union ratio between the target code and the identification code being greater than a preset value, and the identification code corresponding to a positive sample used in a training process of the first neural network model,
sampling the target code according to the target information, to obtain a sampled image comprising:
in response to the target code satisfying a resolution condition, upsampling the target code based on an image super-resolution reconstruction technology and through a second neural network model, to obtain the sampled image, wherein a weight corresponding to an edge region of the target code in a hidden layer of the second neural network model is adjusted to be greater than a preset value, and
decoding the sampled image, to obtain an identification result corresponding to the identification code.

8. The apparatus according to claim 7, wherein, when the processor is configured to cause the apparatus to sample the target code according to the target information, to obtain the sampled image, the processor is configured to cause the apparatus to perform operations comprising:
in response to obtaining the to-be-detected picture by picture setting and the target code satisfying a resolution condition, upsampling the target code according to the target information, to obtain the sampled image.

9. The apparatus according to claim 7, wherein, when the processor executes the instructions, the processor is further configured to cause the apparatus to perform operations comprising:
filtering a logo region of a target code in a training sample before training the second neural network model.

10. The apparatus according to claim 7, wherein, when the processor is configured to cause the apparatus to obtain the to-be-detected picture, the processor is configured to cause the apparatus to perform one of the following two manners:
obtaining the to-be-detected picture by picture setting; or
obtaining the to-be-detected picture by scanning.

11. The apparatus according to claim 7, wherein:
the detection result further comprises an identification code type.

12. The apparatus according to claim 11, wherein, when the processor is configured to cause the apparatus to decode the sampled image, to obtain the identification result corresponding to the identification code, the processor is configured to cause the apparatus to perform operations comprising:
decoding the sampled image according to the identification code type, to obtain the identification result corresponding to the identification code.

13. A non-transitory computer readable storage medium storing computer readable instructions, wherein, the computer readable instructions, when executed by a processor, are configured to cause the processor to perform operations comprising:
obtaining a to-be-detected picture;
detecting an identification code in the to-be-detected picture to obtain a detection result comprising target information of a target code corresponding to the identification code by:
detecting the identification code in the to-be-detected picture through a first neural network model, to obtain the detection result, an intersection-over-union ratio between the target code and the identification code being greater than a preset value, and the identification code corresponding to a positive sample used in a training process of the first neural network model;
sampling the target code according to the target information, to obtain a sampled image comprising:
in response to the target code satisfying a resolution condition, upsampling the target code based on an image super-resolution reconstruction technology and through a second neural network model, to obtain the sampled image, wherein a weight corresponding to an edge region of the target code in a hidden layer of the second neural network model is adjusted to be greater than a preset value; and
decoding the sampled image, to obtain an identification result corresponding to the identification code.

14. The non-transitory computer readable storage medium according to claim 13, wherein, when the computer readable instructions are configured to cause the processor to perform sampling the target code according to the target information, to obtain the sampled image, the computer readable instructions are configured to cause the processor to perform operations comprising:
in response to obtaining the to-be-detected picture by picture setting and the target code satisfying a resolution condition, upsampling the target code according to the target information, to obtain the sampled image.

15. The non-transitory computer readable storage medium according to claim 13, wherein, when the computer readable instructions are configured to cause the processor to obtain the to-be-detected picture, the computer readable instructions are configured to cause the processor to perform one of the following two manners:
obtaining the to-be-detected picture by picture setting; or
obtaining the to-be-detected picture by scanning.

16. The non-transitory computer readable storage medium according to claim 13, wherein:
the detection result further comprises an identification code type.

17. The non-transitory computer readable storage medium according to claim 16, wherein, when the computer readable instructions are configured to cause the processor to decode the sampled image, to obtain the identification result corresponding to the identification code, the computer readable instructions are configured to cause the processor to perform operations comprising:

decoding the sampled image according to the identification code type, to obtain the identification result corresponding to the identification code.

18. The non-transitory computer readable storage medium according to claim 13, wherein, when the computer readable instructions are executed by the processor, the computer readable instructions are configured to further cause the processor to perform operations comprising:

filtering a logo region of a target code in a training sample before training the second neural network model.

* * * * *